No. 623,240. Patented Apr. 18, 1899.
A. E. ELLIOTT.
VEHICLE WHEEL.
(Application filed Dec. 10, 1898.)
(No Model.)

Witnesses,

Inventor
Arthur E. Elliott
By Dewey Strong & Co.
Attys

UNITED STATES PATENT OFFICE.

ARTHUR E. ELLIOTT, OF MODESTO, CALIFORNIA.

VEHICLE-WHEEL.

SPECIFICATION forming part of Letters Patent No. 623,240, dated April 18, 1899.

Application filed December 10, 1898. Serial No. 698,809. (No model.)

*To all whom it may concern:*

Be it known that I, ARTHUR E. ELLIOTT, a citizen of the United States, residing at Modesto, county of Stanislaus, State of California, have invented an Improvement in Vehicle-Wheels; and I hereby declare the following to be a full, clear, and exact description of the same.

My invention relates to improvements in the construction of wheels which are designed for use upon vehicles—such as wagons, carriages, buggies, or farming implements—and in any place where such wheels are available.

It consists, essentially, in a novel construction of a composite wheel made partly of metal and partly of wood and comprises details of construction, which will be more fully explained by reference to the accompanying drawings, in which—

Figure 1:
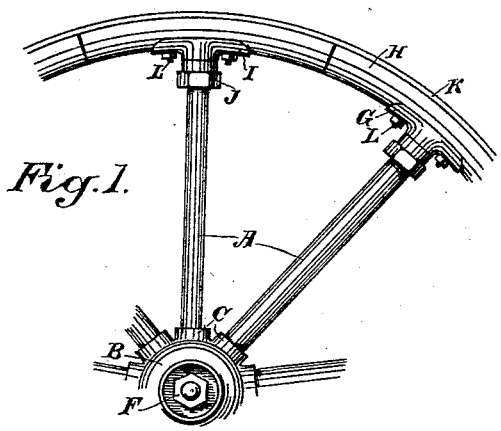
Figure 2:
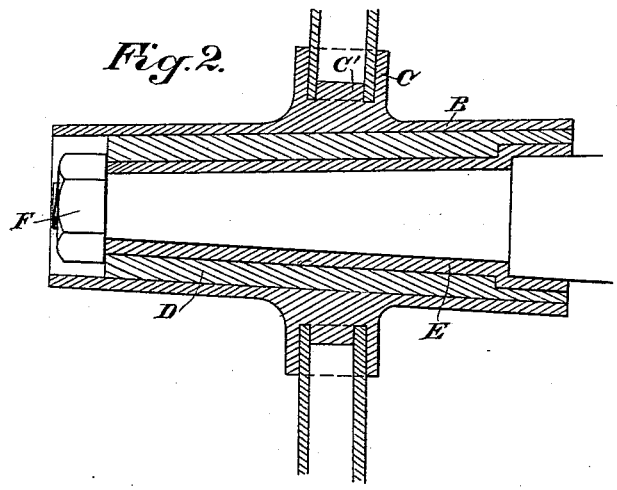
Figure 3:
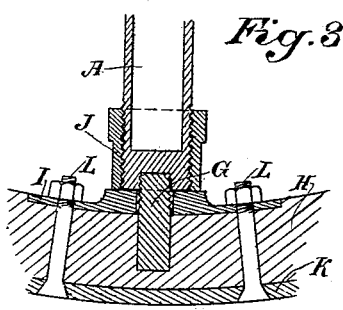
Figure 5:
Figure 4:
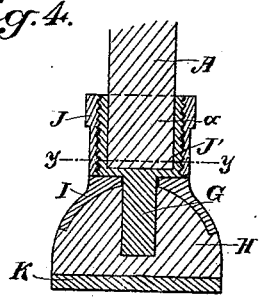

Figure 1 is a partial view of my wheel. Fig. 2 is a longitudinal section through the hub. Fig. 3 is a section showing the connection of the spoke with the felly. Fig. 4 is a similar view showing the arrangement when a wooden spoke is used. Fig. 5 is a section on line $y\ y$ of Fig. 4.

The object of my invention is to provide wheels for vehicles in which I obtain all the strength and rigidity of the metal wheel and its insensibility to the effects of expansion and contraction by moisture or heat, while at the same time I overcome the objection of an entire metal wheel caused by the inelasticity and "dead action," as it is called. The improvements also enable me to adjust the fellies with relation to the tire, so as to keep the latter constantly tight upon the wheel.

In my improved wheel the spokes A are made tubular, of steel or any other suitable metal. The hub B is cast of metal, the spokes being adjusted with relation to the hub, so that the sockets C are cast about the spoke and a portion of the metal, as shown at C', enters the interior of the spoke. This hub is cast upon the inner ends of the spokes, which are suitably disposed with relation to the mold, and by means of clay plugs introduced into the spokes the chamber for the metal C' is formed at the inner ends. The hub and tubular spoke are thus firmly united together. The hub is made tapering or of any desired shape, and a wooden bushing D is driven or fitted into its interior. Within this wooden bushing fits the iron or steel box E, within which the usual axle-spindle is turnable, and the outer end of the cast hub B extends far enough beyond the end of the spindle-box and the wooden bushing to receive the nut F, which screws upon the end of the spindle to retain the wheel thereon. The outer ends of the spokes are screw-threaded both outside and inside. Into the interior screw-thread is fitted the screw-threaded end of a tenon G, which is adapted to fit into holes bored in the felly H.

The felly-plate I is sunk flush with the wood at the end of each of the spokes and is bored to admit of the tenon passing through it, while the end of the spoke abuts against the plate, and is thus prevented from driving into the felly, while the curvature of the felly-plates clasping the felly prevents its being split.

Upon the outside threads of each spoke A is fitted a screw-threaded sleeve or thimble J, which is screwed up so as to abut against the thickened portion of the felly-plate.

The tire K is secured in the usual manner by tire-bolts L passing through it and the felly, and for convenience in my present construction and to firmly lock the felly-plates I have shown these bolts as passing also through the outer ends of the felly-plates, being secured thereto by nuts on the inner ends of the tire-bolts.

Whenever the tire becomes loosened by wear and concussion upon the road, it is only necessary to give the sleeves or thimbles J a slight turn outward to cause the felly to fit absolutely tight within the tire. Any separation of the joints of the felly caused by this outward expansion is filled by means of wedges, which are driven into the spaces between the ends of the felly-sections and are retained in place by the joint-plate, which is fitted at these points. By thus constructing the wheel with the exterior metal hub, with the spokes rigidly secured therein and the interior wooden bushing and the wooden felly for the wheel inside of the tire, I provide an extremely rigid construction for wheels, while at the same time allowing a certain amount of elasticity or life, which is necessary to the best operation of the wheel.

It will be understood that the spokes might be threaded upon the inner ends and be loosely turnable in the hub-sockets C; but I prefer to cast them rigidly with the hub on account of the greater strength which is thus produced.

In some cases, or whenever it is found desirable to use wooden spokes for the wheel, the sockets C are made of sufficient length and the wooden spokes are driven tightly into the sockets. In this case the outer end of the spoke is made with an oval-shaped tenon, as shown at $a$, and the exteriorly-screw-threaded metal end J' is driven upon this oval socket, which by its shape prevents its turning, and the thimble J is turnable upon this screw-threaded end piece.

The object of the oval tenon upon the end of the wooden spoke is to prevent the metal end from turning upon the spoke when the sleeve or thimble J is turned to set the tire. In this construction the end J' will have the metal tenon G formed upon it to extend into the felly.

The outside of the thimble or sleeve J is properly formed to receive a wrench or other tool by which it may be turned and advanced upon the threads, and if it be found necessary a lock-nut may be also fitted to the threaded portion.

Having thus described my invention, what I claim as new, and desire to secure by Letters Patent, is—

1. In a vehicle-wheel, the radial spokes, a hollow hub having radial sockets coincident with and surrounding the inner ends of the spokes and central spurs extending into the interior of the spokes, said hub being cast upon and about the spokes at a single operation, a wooden bushing fitting the interior of the hub and an axle-box fitting the interior of the bushing, screw-threaded sleeves or thimbles fitting the correspondingly-threaded outer ends of the spokes, metal screw-threaded tenons fitting the interior of the outer ends of the spokes, wooden fellies bored and fitting said tenons and felly-plates correspondingly bored to admit the tenons, having inner flat surfaces against which the ends of the screw-threaded sleeves abut.

2. In a vehicle-wheel, tubular metal spokes, a hub having radial sockets cast integral with and upon the inner ends of the spokes, and an interior wooden bushing and metal axle-box, metallic tenons projecting from the outer ends of the spokes, upon which tenons the wooden fellies of the wheel are fitted, an exterior metallic tire, felly-plates bored to fit over the tenons, bolts extending through the tire and the ends of the felly-plates whereby they are locked in place, said felly-plates having a flat inner surface against which the ends of the spokes abut, a screw-threaded sleeve or thimble fitting the exterior screw-threaded nuts of the spoke and turnable thereon so as to expand the felly and keep the tire tight thereon.

In witness whereof I have hereunto set my hand.

ARTHUR E. ELLIOTT.

Witnesses:
S. H. NOURSE,
JESSIE C. BRODIE.